March 20, 1962  A. D. WILLIAMS  3,025,784
PORTABLE GRILL
Filed Dec. 15, 1958  2 Sheets-Sheet 1

Arthur D. Williams
INVENTOR.

BY *Clarence A. O'Brien
and Harvey B. Jacobson*
Attorneys

March 20, 1962 A. D. WILLIAMS 3,025,784
PORTABLE GRILL
Filed Dec. 15, 1958 2 Sheets-Sheet 2

Arthur D. Williams
INVENTOR.

BY *(signatures)*
Attorneys 3,025,784
PORTABLE GRILL
Arthur D. Williams, 914 S. Cedar St., Little Rock, Ark.
Filed Dec. 15, 1958, Ser. No. 780,313
1 Claim. (Cl. 99—446)

This invention relates to improvements in portable grills for broiling meats, fish, fowl, and the like by heat from charcoal fire.

The principal object of the invention is to provide a grill for the above purposes with improved means for broiling such foods on a horizontal grid by burning beds of charcoal in foraminous hollow grates suspended at opposite sides of the grid for swinging adjustment upwardly and downwardly toward and from the grid for varying the degree of heat to which the foods on the grid are subjected, and which are arranged for subjecting the foods to heat both above and below the same simultaneously.

Another object is to provide a grid as in the foregoing which is adapted for easy cleaning and for grilling by broiling over an open or a closed charcoal fire, and for use as a stove if desired.

Still another object is to provide a grill according to the foregoing which is light in weight, inexpensive to manufacture and durable.

These together with other objects and advantages which will become subsequently apparent reside in the details of construction and operation as more fully hereinafter described, and claimed, reference being had to the accompanying drawings forming a part hereof, wherein like numerals refer to like parts throughout, and in which:

Figure 1:
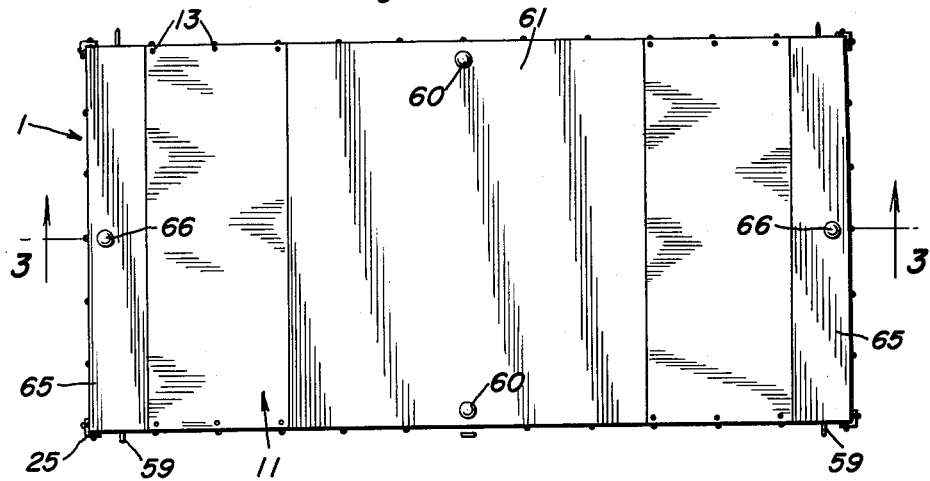
FIGURE 1 is a view in plan of a portable grill constructed in accordance with this invention.
Figure 2:
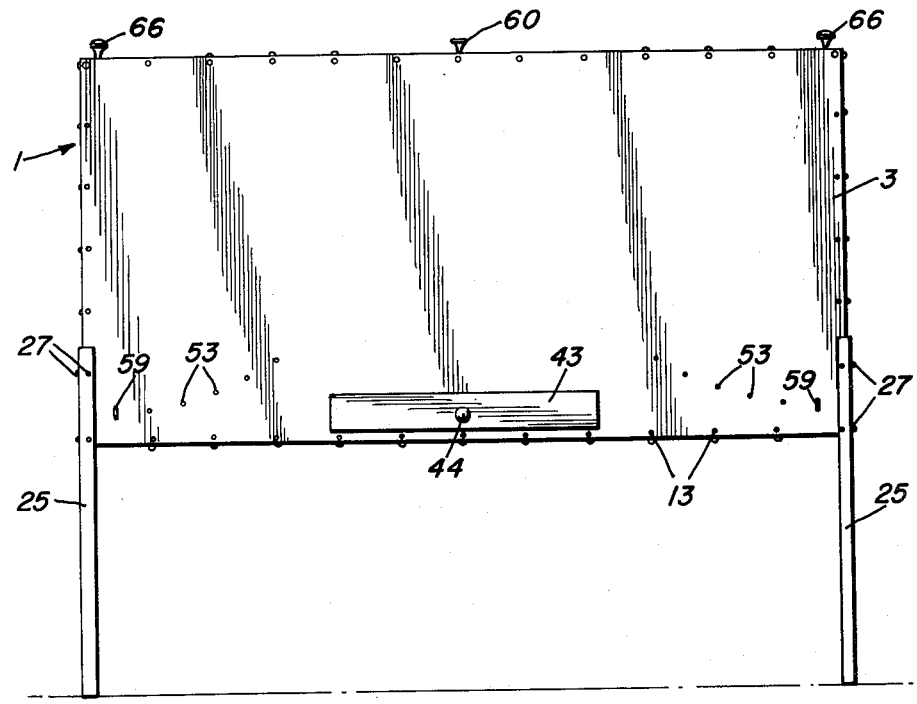
FIGURE 2 is a view in front elevation of the same.

Referring to the drawings by numerals, the grill of this invention, in the preferred embodiment illustrated in the drawings comprises a rectangular, oblong oven 1 having front, rear, end and bottom walls 3, 5, 7, 9, respectively, and a top wall designated generally by the numeral 11, all formed, preferably, from sheet metal and riveted, as at 13, to a rectangular frame comprising top and bottom side angle bars 15, 17 and top, bottom and upright end angle bars 19, 21, 23, respectively. Angle iron corner legs 25 riveted to the oven 1, as at 27, supports said oven.

Removably supported in the center of the oven 1 in spaced, remote relation to the end walls 7 and spaced from the front and rear side walls 3, 5 and also from the top wall 11 is a rectangular grid stand 29 comprising vertically spaced upper and lower foraminous grid plates 31, 33, of open mesh wire, supported by front and rear pairs of corner legs 35, 37 which rest on the bottom wall 9 and are interposed between pairs of front and rear horizontal cleats 39, 41 suitably fixed to and projecting from the bottom side angle bars 17.

A drip pan 43 with a handle knob 44 thereon, is provided between the front and rear legs 35, 37 of the pairs and beneath the lower grid plate 33 and is slidable into and out of the front side wall 3 on angle guide bars 45 extending transversely in the bottom of the oven 1 and suitably secured in said bottom to the bottom side angle bars 17.

Figure 3:
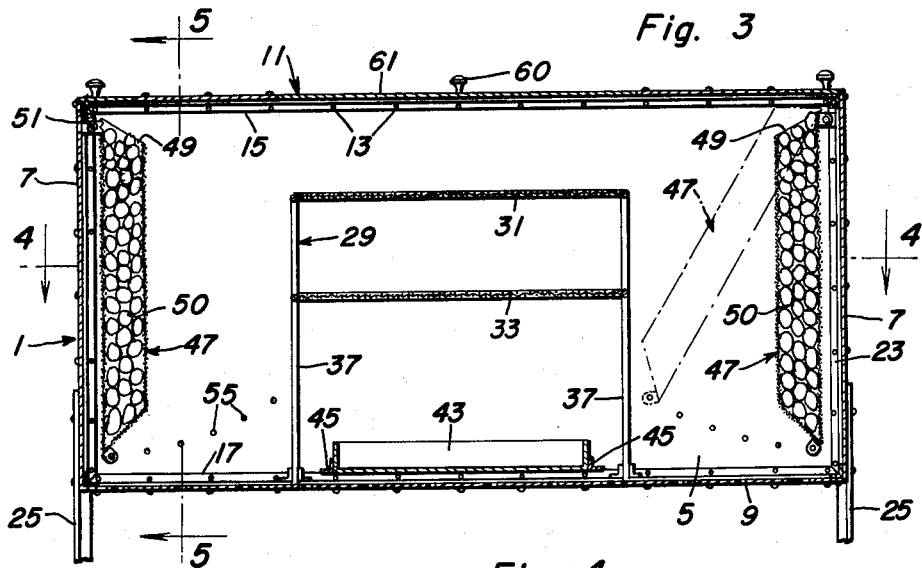
FIGURE 3 is a view in vertical longitudinal section taken on the line 3—3 of FIGURE 1.
Figure 4:
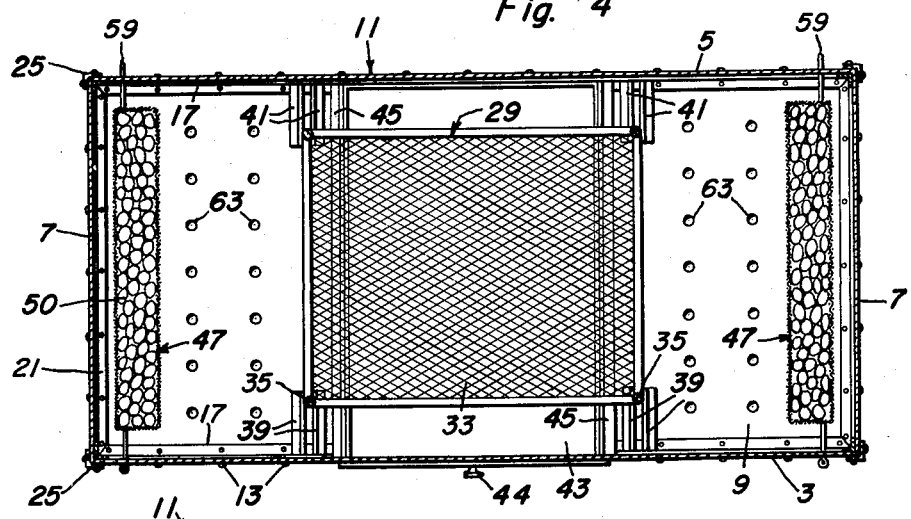
FIGURE 4 is a view in horizontal section taken on the line 4—4 of FIGURE 3.
Figure 5:
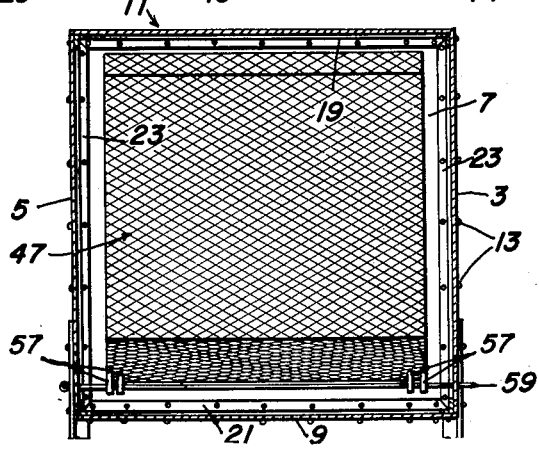
FIGURE 5 is a view in vertical transverse section taken on the line 5—5 of FIGURE 3.

A pair of upright, hollow rectangular, basket grates 47, of foraminous material, preferably of open mesh wire are provided in opposite ends of the oven 1 at opposite sides and spaced from the stand 29. The grates 47 have the form of flat baskets with open tops 49 for loading charcoal 50 therein and burning the same and are hinged, as at 51, to the end walls 7 adjacent the top wall 11 for swinging from vertical position upwardly and downwardly toward and from the grill stand 29 into different angular positions, one of which is shown in broken lines in FIGURE 3, to vary the degree of heat to which food on the grid plates 31, 33 is subjected, and so that foods on said plates will be subjected to the action of heat over and under the foods.

Means is provided for retaining each grate 47 in either vertical position or in different inclined angular positions comprising series of spaced apart complemental openings 53, 55 in the front and rear side walls 3, 5 between the stand 29 and the adjacent end wall to which the grate 47 is pivoted, the series of openings being arranged in arcs concentric to the axis of swinging of the grate. A pair of apertured bottom lugs 57 on the bottom of the grate 47 at each side thereof are provided and a keeper rod 59 slidable through the complemental openings in the series 53, 55 and through the lugs 57. As will be seen, the keeper rods 59, openings 53, 55 and lugs 57 provide means for securing the grates 47 to the front and rear side walls 3, 5 in different adjusted positions of said grates 47.

The top wall 11 includes a rectangular, central, removable lid section 61 having handles 60 thereon, and which seats on top of the front and rear side angle bars 15, and is of a size such that when it is removed the grid stand 29 may be removed and replaced through the top wall 11. The bottom wall 9 is provided between and below the grid stand 29 and the end walls 7 with transverse rows of openings 63 for admitting atmospheric air into the oven 1 for combustion purposes. The top wall 11 further includes a pair of transverse, end damper flaps 65 with handles 66 thereon, and which are disposed directly over the tops 49 of the grids 47 and seat on the front and rear top side bars 15 for removal for access to the grates 47 to load the grates with charcoal and ignite the same therein, said flaps 65 being slidable on said bars 15 for variably opening said flaps.

In using the described grill, the lid section 61 is removed. The grid stand 29 is then removed out of the oven 1, the grid plates 31, 33 loaded with meat or other food to be grilled, either singly or both, as desired, and the grid stand 29 replaced in the oven. With the grates 29 loaded with charcoal, they may be adjusted in the manner already described for variably grilling the meats or other foods on the grid plates, by subjecting the foods on the plate to heat both from above and below said plates. By replacing the lid section 61 and variably opening the damper flaps 65, the meat or other food may be broiled with a substantially closed fire. However, with the lid section 61 removed, the fire is subjected to a greater draft thereby causing it to produce more heat.

As will be clear, the degree of heat, to which meats or other foods on the grid plates 31, 33 is subjected may be varied by partially opening the damper flaps 65 and the lid section 61. Also, as will be clear, the oven 1 with the lid section 61 in place may be used as a stove for cooking on the top wall 11 with the damper flaps 65 partially opened to vary combustion in the oven 1. The use of the drip pan 43 will be obvious.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may

What is claimed as new is as follows:

A grill comprising, in combination, a generally rectangular oven embodying top, bottom, side and end walls cooperatively defining the desired oven space, a stand located in said space and embodying spaced legs having ends resting on and secured to the interior of the bottom wall, said legs supporting spaced parallel formaminous grid plates located one above the other and beneath a central portion of the top wall, said central portion of the top wall being provided with a readily openable and closable lid permitting access to be had to the grid plates, one end of said stand being spaced from an adjacent end wall of the oven, lower portions of the side walls above the bottom wall and in the space between the stand and end wall having rows of selectively usable keeper openings arranged in arcs of predetermined radius, at least one vertically elongated generally rectangular foraminous basket adapted to contain and burn charcoal and constituting a grate and confined for operation in the space between the stand and said end wall, said basket having an accessible open upper end to permit the same to be filled with charcoal, an upper edge of an outwardly disposed wall of the basket being hinged to said oven so that the basket may be swung between the side walls toward and from the end wall and stand, the lower end of said basket being provided with depending lugs having apertures therein, and an adjusting and retaining rod spanning said space with portions thereof extending through the apertures in the lugs and end portions thereof passing through the aforementioned keeper openings, whereby the angularity of the suspended basket may be varied in relation to the vertical and said basket moved closer to or farther from the stand and retained in a selected position, said top wall between said end wall and lid being provided with an opening permitting access to the head of the upper open end of the basket, an openable and closable damper flap movably mounted within said last named opening, and a removable drip pan slidably mounted below said stand within the oven.

References Cited in the file of this patent

UNITED STATES PATENTS

| | | |
|---|---|---|
| 402 | Spratley | Sept. 25, 1837 |
| 79,195 | Bosdevex | June 23, 1868 |
| 161,790 | Houssee | Apr. 6, 1875 |
| 697,506 | MacCulloch | Apr. 15, 1902 |
| 905,502 | Conley | Dec. 1, 1908 |
| 1,028,012 | Foster | May 28, 1912 |
| 2,441,190 | Fuller | May 11, 1948 |
| 2,573,988 | Saltzberg | Nov. 6, 1951 |
| 2,727,505 | Hood | Dec. 20, 1955 |
| 2,843,109 | Chapla | July 15, 1958 |
| 2,885,950 | Stoll et al. | May 12, 1959 |
| 2,923,229 | Halford | Feb. 2, 1960 |
| 2,925,028 | Haynes et al. | Feb. 16, 1960 |

FOREIGN PATENTS

| | | |
|---|---|---|
| 1,011 | Great Britain | 1912 |
| 14,334 | Great Britain | 1914 |